(No Model.) 7 Sheets—Sheet 1.

L. B. BERRIEN.
CORN PLANTER.

No. 335,205. Patented Feb. 2, 1886.

Witnesses:
Harry T. Jones
Marie L. Price

Inventor:
Lemant B. Berrien
By West & Bond
attys (No Model.) 7 Sheets—Sheet 2.

L. B. BERRIEN.
CORN PLANTER.

No. 335,205. Patented Feb. 2, 1886.

Witnesses:
Harry T. Jones
Marie L. Price

Inventor:
Leonard B. Berrien
By West & Bond
attys (No Model.) 7 Sheets—Sheet 3.

L. B. BERRIEN.
CORN PLANTER.

No. 335,205. Patented Feb. 2, 1886.

Witnesses.
Harry T. Jones.
Marie D. Price.

Inventor
Leonard B. Berrien
By West & Bond
Attys

(No Model.)

L. B. BERRIEN.
CORN PLANTER.

No. 335,205. Patented Feb. 2, 1886.

Witnesses:
Harry T. Jones
Marie L. Price

Inventor:
Leonard B. Berrien
By West & Bond
Attys

(No Model.)  7 Sheets—Sheet 5.
L. B. BERRIEN.
CORN PLANTER.

No. 335,205.  Patented Feb. 2, 1886.

Witnesses:
Harry T. Jones
Marie L. Price

Inventor:
Leonard B. Berrien
By West & Bond
attys (No Model.) 7 Sheets—Sheet 6.

L. B. BERRIEN.
CORN PLANTER.

No. 335,205. Patented Feb. 2, 1886.

Witnesses:
Harry T. Jones
Marie L. Price

Inventor:
Leonard B. Berrien
By West & Bond
Att'ys (No Model.)  7 Sheets—Sheet 7.

L. B. BERRIEN.
CORN PLANTER.

No. 335,205.  Patented Feb. 2, 1886.

Witnesses:
Harry T. Jones
Marie E. Price

Inventor:
Leonard B. Berrien
By West & Bond
Attys

UNITED STATES PATENT OFFICE.

LEONARD B. BERRIEN, OF PEORIA, ILLINOIS, ASSIGNOR TO THE AVERY PLANTER COMPANY, OF SAME PLACE.

CORN-PLANTER.

SPECIFICATION forming part of Letters Patent No. 335,205, dated February 2, 1886.

Application filed July 31, 1885. Serial No. 173,128. (No model.)

*To all whom it may concern:*

Be it known that I, LEONARD B. BERRIEN, residing at Peoria, in the county of Peoria and State of Illinois, and a citizen of the United States, have invented a new and useful Improvement in Corn-Planters, of which the following is a full description, reference being had to the accompanying drawings, in which—

Figs. 19 and 20, a plan view and edge elevation of the beveled gear which receives the cup-plate.

This invention relates to seed-dropping devices for use in a corn-planter, to be operated either through the medium of a lever, by an operator riding on the machine, or through the medium of a check-rower movement attached to the machine, and has for its objects to operate the devices in both seed-boxes by which the seed is dropped with each advance of the dropping or cup plate through the throw of the pawl-bar by the use of a single set of pawls on the bar for each cup-plate, by causing the advance of one cup-plate to advance the other cup-plate through an intermediate connection, and to improve the construction and operation of the dropping devices, both as to the several elements which enter into the mechanism and the whole mechanism; and its nature consists in the several parts and combinations of parts hereinafter described, and pointed out in the claims as new.

In the drawings, the front or runner section only of a planter is shown, as such section is all that is required to illustrate the present invention.

A represents a front cross-sill, and A′ a rear cross-sill, which sills are located, one in front of the other, at the required distance apart to receive the runner-support and the seed-boxes, and are of a length for the width of machine desired.

B B′ represent the seed-boxes, each, as shown, of a rectangular shape in cross-section, a box being located at each end of the frame or sills A A′.

Figures 3, 4, 5:
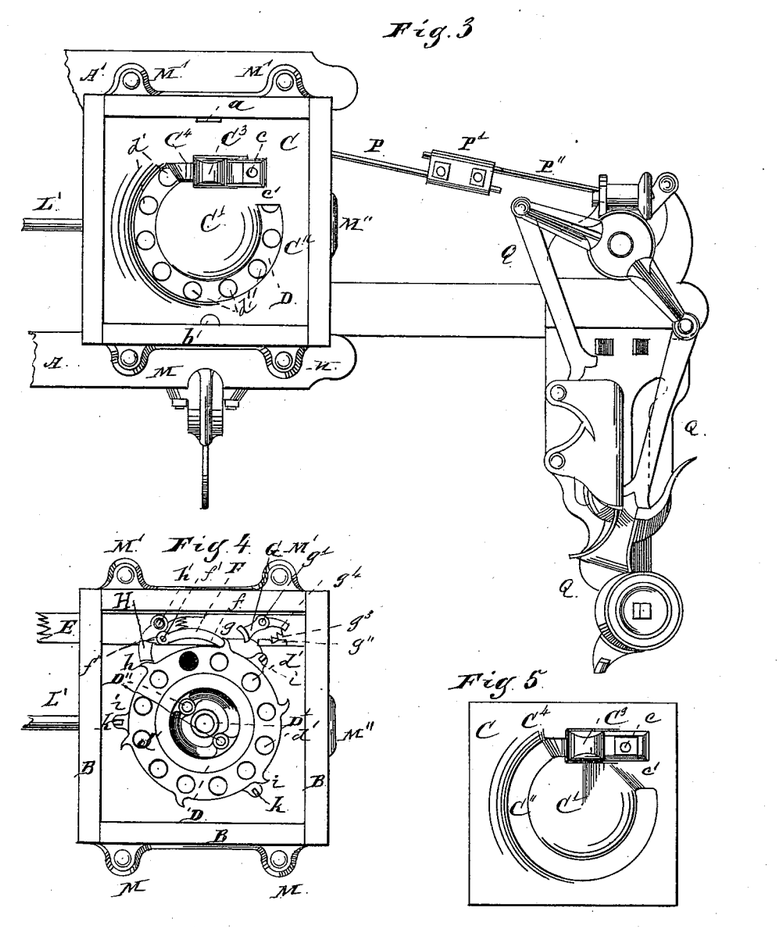
Fig. 3, a detail, being a top or plan view showing a connection between a check-rower movement and the pawl-bar of the seed-dropping devices.
Fig. 4, a plan view of the seed-box with the cap-plate and cut-off removed to show the cup-plate and the operating-pawls therefor.
Fig. 5, a detail, being a top view of the cap-plate and cut-off.

C is the outer portion of a cap or cut-off plate, and C′ the inner or central portion of such plate, the two sections being united at one corner by a web, *c*′, and between the sections is an opening, C″, of a circular form for nearly its entire length, with a straight portion at one end running over to the web *c*′, in which straight portion is located the cut-off dog C⁴, the acting end of which, as shown, terminates in line, or nearly so, with the terminal point of the curved portion of the opening C″, where it meets the straight portion. The body portion of the dog C⁴ is located beneath a cap, C³, attached to the cap-plate C by a bolt, *c*, which passes through the cap C′ and the web *c*′, as shown in Fig. 5, and at the pivoted end of the dog are trunnions, which enter recesses formed in lugs depending from the cap $C^3$, to pivotally attach the dog, so that it is free to rise and fall as required in use. The upper face of the dog is to be provided with a flange, which lies in contact with the exterior face of the cap $C^3$ when the parts are together, as shown in Fig. 5, and the dog is held down at its acting end by a spring, one end of which engages the under face of the cap $C^3$ and the other encircles a pin or stud on the dog. The cap-plate is held in place in the seed-box in the construction shown by engaging a stationary lug, $a$, on the inside of the box, underneath which lug the edge of the plate comes; and the opposite side of the box is provided with a sliding plate, $b$, which can be made to engage with the edge of the plate C, and when engaged locked by a bolt, $b'$, which bolt, as shown, has a thumb-nut for the easy and quick loosening of the plate $a'$, to raise it and remove the cap-plate and cut-off.

Figure 1:
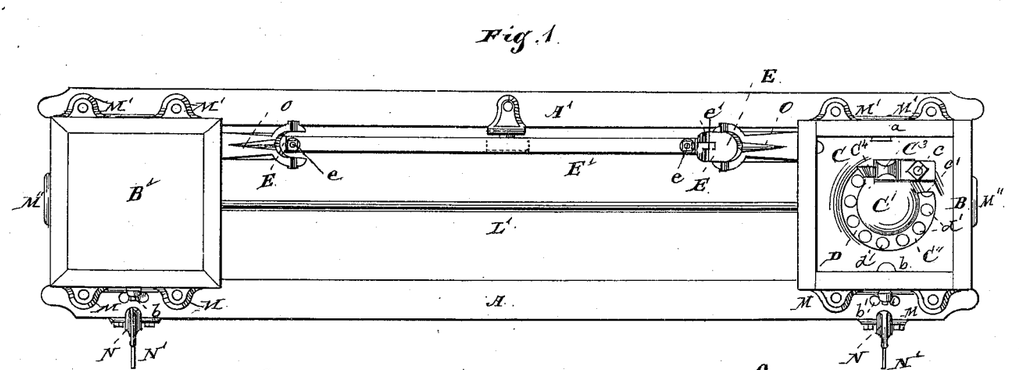
Figure 1 is a top or plan view with the cover of one of the seed-boxes removed to show the cap-plate.
Figure 2:
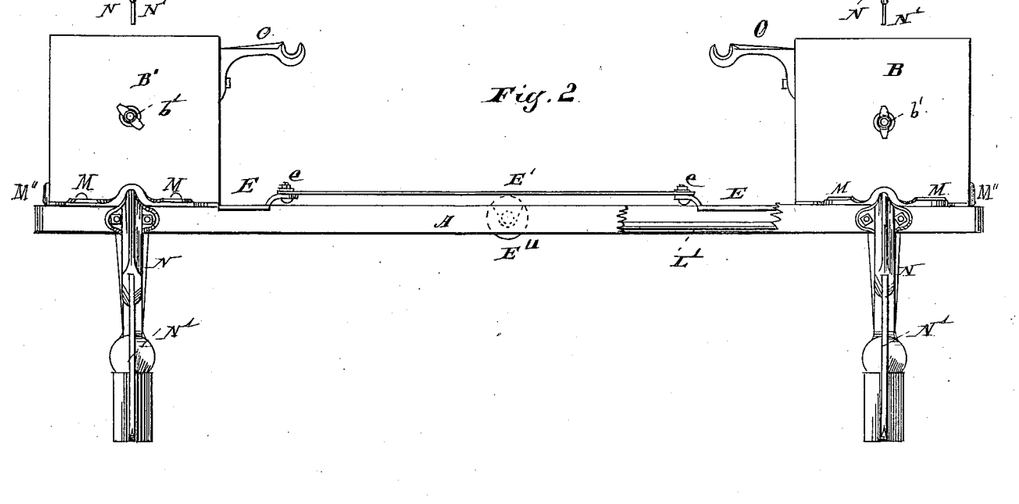
Fig. 2, a side elevation with a portion of the front rail broken out to show the cross-shaft between the seed-dropping devices.

D is a circular plate having its periphery provided with a series of teeth or notches, $d$, and this plate D is provided with a series of holes, $d'$, for the reception of the charge of seed, which holes are near the periphery of the plate and extend entirely around; and, as shown, the under face of the plate around each hole $d'$ is projected down to bring the bottom of the hole in line with the bottom of the plate at the center, and the plate at the center, as shown, has an opening, $D'$, on each side of which, in line one with the other, is a socket, $D''$. The plate D is located immediately below the cap-plate C $C'$, and when in position the holes $d'$ in the plate D are in line with the opening $C''$, as shown in Figs. 1 and 3; and, as shown, the cap-plate is supported from the under side by legs $C^5$, Fig. 11, which project down and rest on the bottom plate, so as to support the cap-plate just clear of the cup-plate D, to allow the cup-plate to be revolved freely.

E is a sliding bar, one end of which, when the parts are together, lies within the interior of the seed-box at one side and the other end of which comes outside of the box, and has bolted or connected thereto one end of a connecting-bar, $E'$, which bar, at the other end, is bolted or connected to a corresponding bar, $E$, for the other seed-box; and, as shown, the connecting-bar $E'$ is supported on an anti-friction roller, $E''$, attached to the rear cross-bar, to facilitate the moving of the bars forward and back. The end of the bar E, which is outside of the seed-box, is provided with a slot, $e'$, to receive the end of a lever, by which the bar is reciprocated, and, as shown, this end of the bar E stands up somewhat in a higher plane than the body portion, and through this end is a bolt, $e$, for attaching the bar to the bar $E'$.

F is a pawl located on the end of the bar E, which lies within the seed-box, and pivotally mounted on a stud or pin, $f'$, extending up from the bar E, so as to have its acting end $f$ in position to engage with the projections or points $d$ on the periphery of the plate D; and, as shown, the limit of the inward throw of the forward end of the pawl is controlled by a stop, $f^3$, on the side of the pawl, which engages with a stop, $f^4$, on the edge of the bar, (see Figs. 23 and 24;) and, as shown, the pawl is held in place on its pivot or stud $f'$ by a split key.

Figure 24:
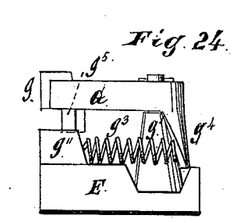
Figs. 24 and 25, an end elevation and a cross-section of the sliding bar and pawls.
Figure 25:
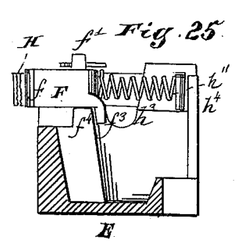
Figure 26:
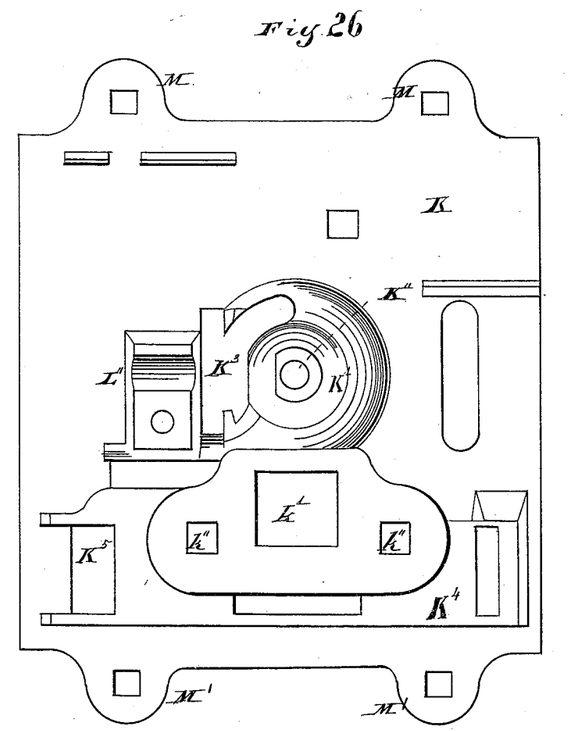
Fig. 26, an under side view of the bottom plate.
Figure 27:
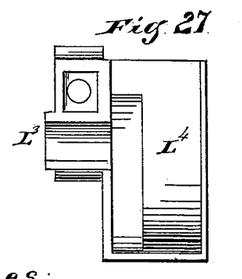
Figs. 27 and 28, a plan view and a side elevation of the housing for the vertical gear.
Figure 28:
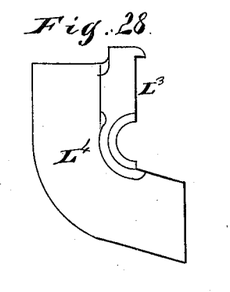

G is a stop-pawl located on the end of the bar E within the seed-box, and pivotally mounted on a stud or pin, $g'$, projecting up from the bar E, and arranged to have its acting end $g$ in position to engage the curved face of the projections $d$ of the plate D, and stop the advance of such plate with the forward movement of the pawl F. As shown, the stop-pawl G is held in position on its stud or pin $g'$ by a split key, and is thrown inward, in position to have its acting end $g$ engage the projections $d$, by a spring, $g^3$, one end of which spring is located in a recess formed in the flange $g''$ on the edge of the bar E, and the other end of which encircles a stud or pin on a tail-piece, $g^4$, running out from the heel of the pawl, as shown in Fig. 24; and the limit of inward throw of the stop-pawl G is controlled, as shown, by a downwardly-projecting lip, $g^5$, on the side of the pawl, which strikes against the inner face of the flange $g''$, and the spring $g^3$ allows the acting end $g$ of the pawl to be raised by the next advance of the plate D, for the passage of the projection $d$, with which it is engaged; and the spring also acts to throw the acting end of the pawl in after the projection has passed, so as to be in position to furnish a stop for the next succeeding projection.

Figure 6:
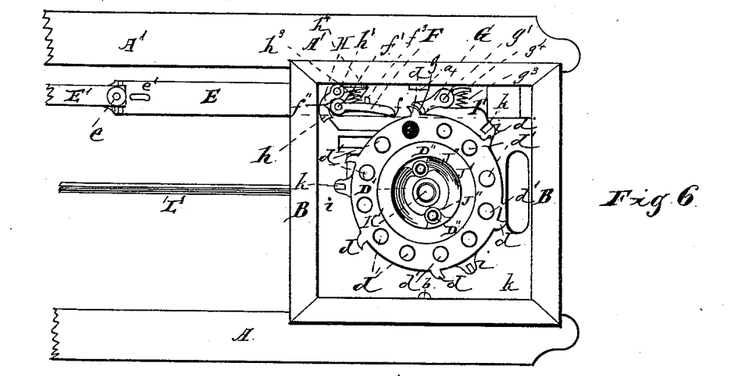
Fig. 6, a plan view of a seed-box with the cap-plate and cut-off removed, showing the operating-pawls in the returned position from that shown in Fig. 4.
Figure 7:
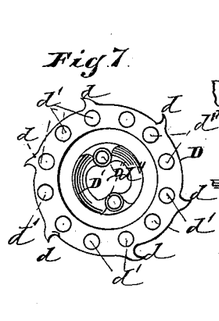
Fig. 7, a detail, being a top view of the cup-plate.
Figure 8:
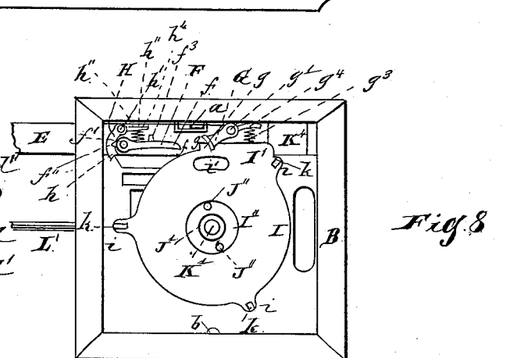
Fig. 8, a plan view of a seed-box with the cap-plate, cut-off, and cup-plate removed.
Figure 9:
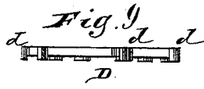
Fig. 9, an edge elevation of the cup-plate.
Figure 10:
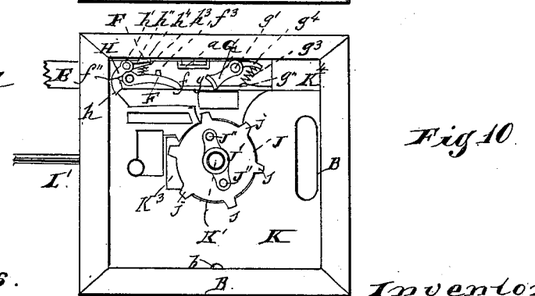
Fig. 10, a plan view of a seed-box with the cap-plate, cut-off, cup-plate, and support-plate removed, showing the beveled gear for operating the cup-plate.
Figure 21:
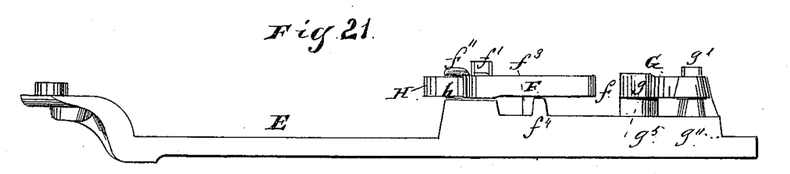
Figs. 21 and 22, a side elevation and a plan view of the slide-bar and pawls.
Figure 22:
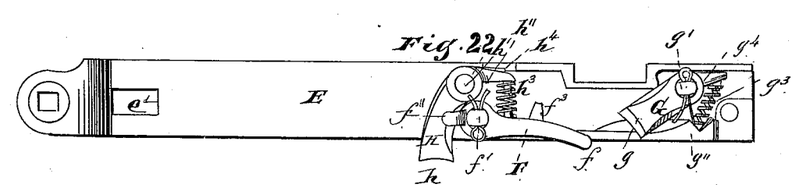

H is a stop-pawl located on the end of the bar E, within the seed-box, and mounted on a stud or pivot, $h'$, projecting up from the bar, and so arranged as to have its acting end $h$ engage the curved face of a projection, $d$, which is advanced in position to be engaged on the advance movement of the pawl F, and, as shown, this pawl is held in position by a lip, $f'''$, running out from the heel of the pawl F and overlying the top of the pawl H. The heel of the pawl H has a tail-piece, $h''$, between which and the pawl F is a coiled spring, $h^3$, the ends of the spring encircling, respectively, a stud on the tail-piece $h''$ and a stud on the side of the pawl F, which spring acts to throw the acting end $f$ of the pawl F into position for use, and also to throw the acting end $h$ of the stop-pawl H into position to engage the projection $d$; and this spring also allows the acting end of the pawl F to ride over the succeeding projection on the advance of the plate D, the acting end of the pawl H being withdrawn for the passage of the projection, with which it engages as such projection is advanced on the return of the pawl F. The limit of inward movement of the pawl H at its acting end is controlled by a stop, $h^4$, on the bar E, against which the tail $h^3$ strikes. The construction and location of these pawls on the bar E are shown in Figs. 21 and 22, and their position after the advance of the bar E and the return of such bar is shown in Figs. 4 and 6, the pawl H forming the stop on the advance of the pawl F, and the pawl G forming the stop on the return of the pawl F.

I is a plate forming a support for the plate D. As shown, this plate I is not a true circle, but has at one side a projecting portion, I', which passes over the edge of the bar E on its inner portion, and furnishes a rest or support for the pawls F G at their acting ends; and the periphery of the plate I is provided with a series of projections, i, each of which is provided with a slot or opening, and this plate I is provided at its center with a circular opening, I'', and on one side, near its periphery, is an opening, i', which is in line with the holes d' as they successively pass around, and also in line with the opening in the bottom plate, which coincides with the dropping-tube, so as to allow the seed caught in the holes d' to drop and enter the seed-duct or dropping-tube.

J is a beveled pinion lying horizontal in the seed-box, and having its upper side at the periphery provided with a series of projections, j', which rest on the plate I. This pinion at its center is provided with a hub or boss, J', having a vertical hole, and on each side of this hub or boss, in line with each other, are pins J'', which enter the holes in the projections D' of the plate D, connecting the plate with the pinion, so that as the pinion is revolved the plate D will be carried around therewith.

Figure 23:
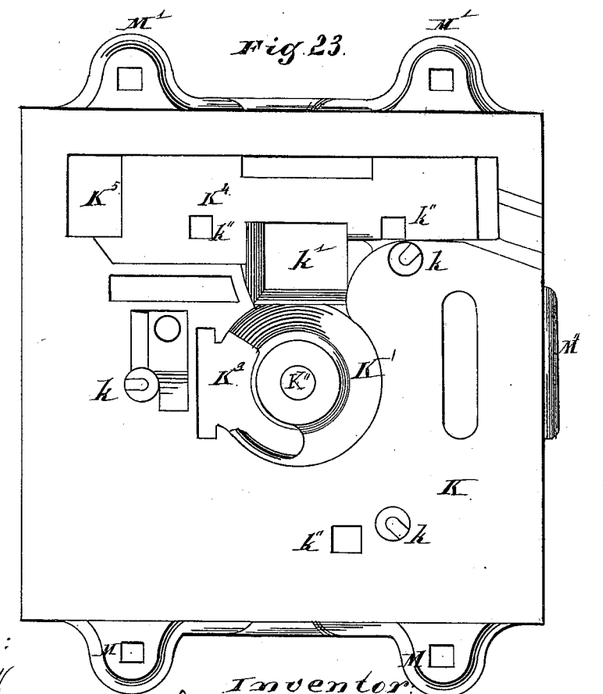
Fig. 23, a top or plan view of the bottom plate.

K is the bottom plate having a central circular depressed portion, K', to receive the beveled pinion J, which pinion is mounted on the stud or pin K'', which enters the hole in the hub J' of the pinion. The depressed portion K' is cut away on one side, so as to leave an opening, K³, which opening extends into the body or main portion of the plate, as shown in Fig. 23. The upper face of this plate K is provided with a series of projections, k, each having an upper end to fit the recess or opening in the ears i of the plate I, and lock such plate to the plate K, and also support the plate at the proper distance above the plate K, to leave a clear space for the rotation of the beveled wheel J, and this plate K has therein an opening, k', which coincides with the opening i' in the plate i, and also with the mouth of the seed-duct or dropping-tube; and, as shown, the plate K on the side which receives the bar E is provided with a recess, K⁴, for the bar E, the bar passing through an opening, K⁵, at the end of the depressed portion K⁴, and, as shown, this plate is provided with holes k'' for the passage of bolts, by which the plate is attached to the runner-frame or support.

Figure 11:
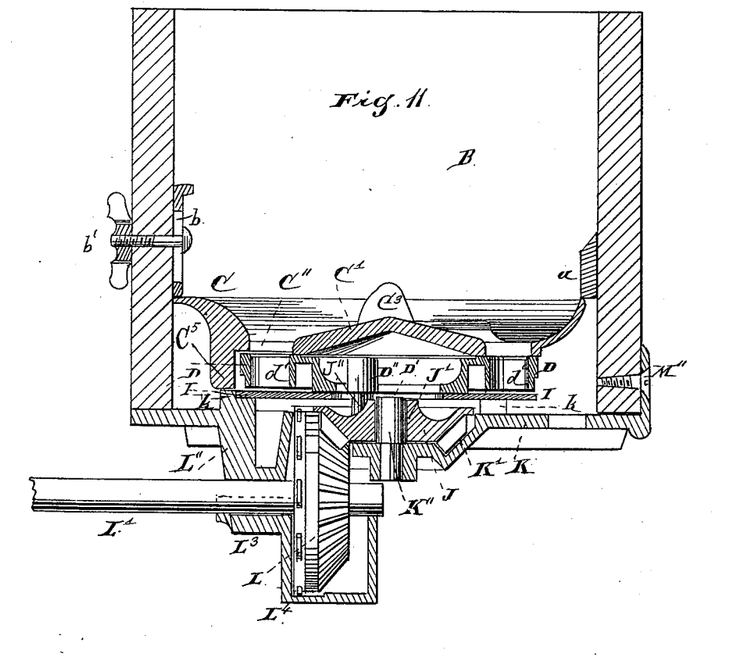
Fig. 11, a sectional elevation of a seed-box with the dropping devices therein.
Figure 12:
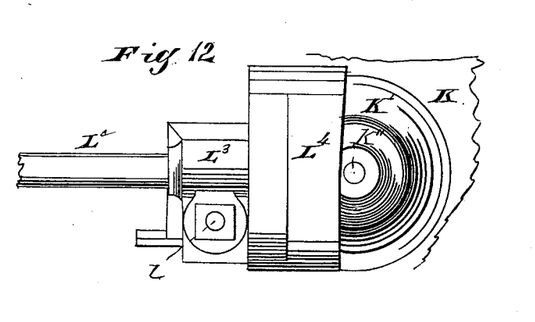
Fig. 12, a bottom view of the seed-box.
Figure 13:
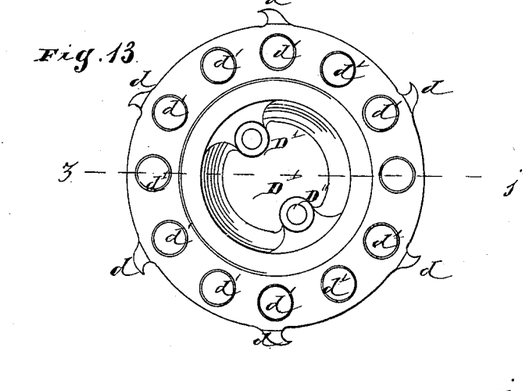
Figs. 13 and 14, a plan view and edge elevation of the cup-plate.
Figure 14:
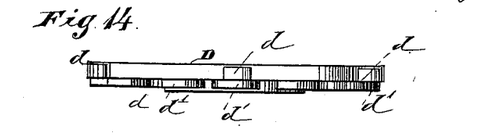
Figures 15, 16, 17:
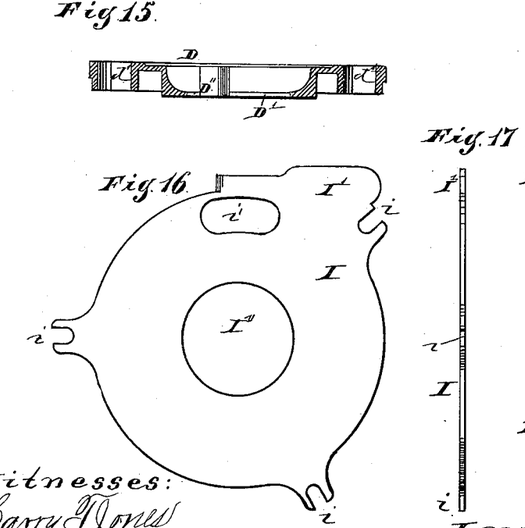
Fig. 15, a section on line *z z* of Fig. 13.
Figs. 16, 17, and 18, a plan view, edge elevation, and section of the support-plate.
Figure 18:
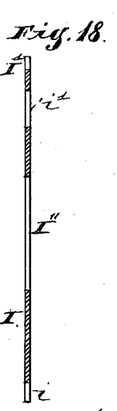
Figure 20:
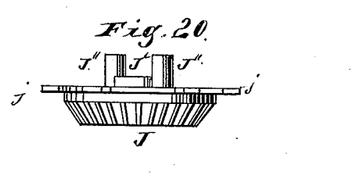

L is a beveled wheel, which meshes with the wheel J, as shown in Fig. 11, the edge of the wheel L entering the opening K³ in the plate K for this purpose. This wheel is mounted on the end of a shaft, L', and, as shown, the bearing for this shaft is formed by a downwardly-projecting flange, L'', having its end face provided with a semicircular recess to receive the shaft, and a flange, L³, on the cap-plate L⁴, the flange having in its upper face a semicircular recess to receive the shaft; and, as shown, the cap L⁴ extends around and forms a cover for the beveled wheel L, to prevent dust and dirt from entering, so as to interfere with the operation of the dropping devices, and this cap L⁴ is secured to the under side of the plate K, around the wheel L, by a bolt, l, which passes through the flange L³ and the projection or flange L''. The shaft L' extends across the machine, and its opposite end has attached thereto a beveled gear corresponding to J, located in the bottom plate, K, of the other seed-box, and this seed-box is also provided with parts corresponding to the cap-plate and cut-off, cup-plate, sliding bar, advancing and stopping pawls, support-plate, and bottom plate, hereinbefore described—in other words, each seed box is provided with duplicate and similar parts, and therefore a description of one seed-box and its parts will answer for both.

M represents ears on the forward edge of the bottom plate, K, for attaching such plate to the front cross-bar, A, and M', ears on the rear edge of the plate K, for attaching the plate to the rear bar, A', the attachment being by bolts or in any other suitable manner; and, as shown, an ear, M'', is formed on the edge of the plate K, through which a screw or other fastening device passes for attaching the seed-box to the plate, and the attachment of the seed-box to the plate is made secure by screws passing through the plate from the bottom and entering the side of the seed-box.

N represents the frames or supports for the runners, one at each end of the frame-work A A', and bolted or otherwise firmly secured to such frame-work, and each carrying a runner, N', as usual, the runner having at its heel end a seed-duct communicating with the hole k' in the plate K, for discharging the seed in the usual manner.

O represents forks, one on the inner side of each seed-box. The fork receives and supports a lever operated by a person seated on the machine, the lower end of which enters the slot e' in the bar E, so that by moving the lever at its upper end the bar E can be reciprocated.

P is a rod, one end of which is hooked into the end of the sliding bar E, and the other enters the clasp P', which clasp also receives the end of another rod, P'', the end of which rod is hooked or otherwise connected to a moving part of a check-rower movement, Q, such movement being similar in construction and operation to that shown and described in Letters Patent of the United States, Leonard B. Berrien, April 1, 1879, No. 213,732, or other style of movement that will by its operation act through the connection P P' P'' to give a reciprocating movement to the bar E.

In operation, whether the sliding bar as a whole is moved from a hand-lever by an operator riding on the machine or from a check-row movement through the connection P P' P'', or other suitable connection, the seed-dropping devices in each seed-box will be operated simultaneously with each movement forward and back of the sliding bar as a whole in the following manner:

The movement of the sliding bar E E', as a whole, in the movement to advance the plate D in the seed-box B, by the engagement of the pawl F with the notches or projections $d$, advances such plate D to the limit of the stroke of the sliding bar, and the plate D is stopped at this point by the engagement of the acting end of the pawl H with the projection or notch which comes in line therewith on such advance. The advance of the plate D advances the beveled gear J a distance corresponding proportionately to the advance of the plate D, through the connection of the pinion with the plate by the pins J'' and sockets D'', and such advance of the pinion J drives the pinion L a part of a revolution, corresponding to that of the pinion J, giving the shaft L' a corresponding rotation, and this shaft correspondingly rotates the pinion L on its opposite end in the seed-box B', which pinion L drives the pinion J, to cause such pinion to advance the plate D in the seed-box B' to the same extent as the plate D is advanced in the seed-box B, as the pinions J L in each seed-box have a corresponding travel through the connecting shaft L', and the plate D is stopped in the seed-box B' at the limit of its advance by the engagement of the pawl corresponding to G in the seed-box B'. The return of the sliding bar as a whole withdraws the end E in the seed-box B and advances the end E in the seed-box B', and on such return movement the pawl F on the end E in the seed-box B' will advance the plate D of that box, and the advance of such plate will, through the pinions J L and shaft L', advance the plate D in the seed-box B, as described for the plate D in the seed-box B', the plate D in the seed-box B being stopped at the limit of its advance by the engagement of the pawl G with the projection $d$, as shown in Fig. 6, and each movement of the sliding bar as a whole will thus advance the seed-dropping devices in each of the seed-boxes simultaneously, as when one seed-plate D is advanced by the action of the pawl F, the plate D for the other seed-box is advanced simultaneously by the action of the bevel-gear J L and the shaft L'. The advancing-pawl and the stop-pawls for each plate D are carried by the same reciprocating plate, so that if such plate acts the pawls must act and produce an advance and a stoppage of the plate at the proper time; and in use the operation of the devices is a positive one, as with each advance of the seed-plate in one seed-box the seed-plate in the other seed-box must be advanced simultaneously through the connection furnished by the beveled gears and shaft.

What I claim as new, and desire to secure by Letters Patent, is—

1. The combination, with a dropper-plate, D, of a corn-planter, of the sliding bar E, carrying the three pivoted pawls, the pawl F, advancing the dropper-plate, the pawl H, acting as a stop to the plate in the advance movement of the sliding bar, and the pawl G, acting as a stop to the plate when the said bar is retracted, substantially as described.

2. The combination, with the dropper-plate D and a beveled pinion, J, located below the said plate and connected therewith, of a sliding bar carrying three pivoted pawls, the pawl F, advancing the dropper-plate when the sliding bar is advanced, the pawl H, acting as a stop on said dropper-plate when the latter is so advanced, and the pawl G, acting as a stop on said dropper-plate when the bar is retracted, substantially as described.

3. The combination, with the dropper-plate D, having notches or projections $d$ on its periphery, of a stationary plate, I, thereunder, a beveled pinion, J, located below the stationary plate and provided with a vertical pin extending through the latter and engaging the dropper-plate, and the sliding bar having a pawl for engaging the periphery of the dropper-plate, substantially as described.

4. The combination, with the dropper-plate D, having notches or projections $d$ on its periphery, of a beveled pinion located beneath and connected with the dropper-plate and a sliding bar having a pawl for engaging the periphery of the dropper-plate, to rotate the latter and transmit motion to the pinion, substantially as described.

5. The combination of two seed-boxes, a dropper-plate in each seed-box, beveled pinions located beneath and connected with the seed-plates, respectively, a shaft having a beveled gear at each end, respectively, engaging the pinions, and a sliding pawl-bar rotating the dropper-plate, so that both droppers are simultaneously advanced when the sliding bar is moved to advance one of the said plates, substantially as described.

6. A cross-shaft running from seed-box to seed-box, and intermediate devices connecting the drop-plate in each seed-box with a cross-shaft, and a sliding bar for operating the drop-plates simultaneously, substantially as and for the purpose specified.

7. A sliding bar carrying at each end actuating-pawls arranged to engage the periphery of and move the drop-plates alternately, one at a time, substantially as specified.

8. The sliding bar E, carrying three pivoted pawls, F, G, and H, in combination with the dropper-plate D, having notches or projections $d$ on its periphery, substantially as described.

LEONARD B. BERRIEN.

Witnesses:
 CHAS. B. McDOUGAL,
 FRANK O. CUNNINGHAM.